United States Patent
Baxter, Jr.

(10) Patent No.: US 8,816,028 B2
(45) Date of Patent: Aug. 26, 2014

(54) POLYISOBUTYLENE COMPOSITION HAVING INTERNAL VINYLIDENE AND PROCESS FOR PREPARING THE POLYISOBUTYLENE POLYMER COMPOSITION

(71) Applicant: C. Edward Baxter, Jr., League City, TX (US)

(72) Inventor: C. Edward Baxter, Jr., League City, TX (US)

(73) Assignee: Petrochemical Supply, Inc., Houston, TX (US)

( * ) Notice: Subject to any disclaimer, the term of this patent is extended or adjusted under 35 U.S.C. 154(b) by 0 days.

(21) Appl. No.: 13/920,496

(22) Filed: Jun. 18, 2013

(65) Prior Publication Data
US 2013/0317189 A1     Nov. 28, 2013

Related U.S. Application Data

(63) Continuation-in-part of application No. 13/500,956, filed on Mar. 9, 2011.

(60) Provisional application No. 61/661,071, filed on Jun. 18, 2012, provisional application No. 61/312,869, filed on Mar. 11, 2010.

(51) Int. Cl.
| | |
|---|---|
| *C08F 2/00* | (2006.01) |
| *C08F 10/00* | (2006.01) |
| *C08F 110/10* | (2006.01) |
| *C08F 4/14* | (2006.01) |

(52) U.S. Cl.
CPC ................. *C08F 4/14* (2013.01); *C08F 110/10* (2013.01)
USPC ...................................... 526/210; 526/348.7

(58) Field of Classification Search
CPC ............. C08F 4/14; C08F 110/10; C08F 2/00
USPC ............................................. 526/210, 348.7
See application file for complete search history.

(56) References Cited

U.S. PATENT DOCUMENTS

| | | | |
|---|---|---|---|
| 2,804,411 | A | 8/1957 | Anderson et al. |
| 2,976,338 | A | 3/1961 | Telfer |
| 3,114,785 | A | 12/1963 | Hervert |
| 4,152,499 | A | 5/1979 | Boerzel et al. |

(Continued)

FOREIGN PATENT DOCUMENTS

| | | |
|---|---|---|
| WO | 01/05857 A1 | 1/2001 |
| WO | 2011112729 A1 | 9/2011 |

OTHER PUBLICATIONS

International Search Report for corresponding International Application No. PCT/US2013/046333.

*Primary Examiner* — William Cheung
(74) *Attorney, Agent, or Firm* — Egbert Law Offices, PLLC

(57) ABSTRACT

A polyisobutylene composition has polyisobutylene molecules with a first portion having a alpha vinylidene molecules, a second portion having beta vinylidene molecules, and a third portion having internal vinylidene molecules. The first portion has less than 75% of the polyisobutylene molecules of the composition. A total of the first portion and the second portion is less than 90% of the polyisobutylene molecules of the composition. The third portion is more than 3% of the polyisobutylene molecules of the composition. A process for forming this polyisobutylene polymer composition passes an isobutylene through a fixed bed reactor having a boron trifluoride/alcohol complex therein so as to produce the polyisobutylene composition.

17 Claims, 3 Drawing Sheets

(56) References Cited

U.S. PATENT DOCUMENTS

| | | |
|---|---|---|
| 4,407,731 A | 10/1983 | Imai |
| 4,427,791 A | 1/1984 | Chang |
| 4,605,808 A | 8/1986 | Samson |
| 4,918,255 A | 4/1990 | Chou et al. |
| 4,935,577 A | 6/1990 | Huss, Jr. |
| 5,191,044 A | 3/1993 | Hoffmann et al. |
| 5,408,018 A | 4/1995 | Rath |
| 5,789,335 A | 8/1998 | Chen |
| 6,060,633 A | 5/2000 | Chen |
| 6,346,585 B1 * | 2/2002 | Johnson et al. ............... 526/130 |
| 6,476,284 B1 | 11/2002 | Ohashi et al. |
| 6,525,149 B1 | 2/2003 | Baxter, Jr. et al. |
| 6,562,913 B1 | 5/2003 | Baxter, Jr. et al. |
| 6,683,138 B2 | 1/2004 | Baxter, Jr. et al. |
| 6,710,140 B2 | 3/2004 | Wettling et al. |
| 6,884,858 B2 | 4/2005 | Baxter, Jr. et al. |
| 6,992,152 B2 | 1/2006 | Lobue et al. |
| 7,037,999 B2 | 5/2006 | Baxter |
| 7,411,104 B2 | 8/2008 | Kim et al. |
| 2006/0079652 A1 | 4/2006 | Baxter, Jr. et al. |
| 2008/0249268 A1 | 10/2008 | Rath et al. |
| 2009/0023882 A1 * | 1/2009 | Hanefeld et al. ........... 526/348.7 |
| 2010/0298507 A1 | 11/2010 | Menschig et al. |

* cited by examiner

POLYISOBUTYLENE COMPOSITION HAVING INTERNAL VINYLIDENE AND PROCESS FOR PREPARING THE POLYISOBUTYLENE POLYMER COMPOSITION

CROSS-REFERENCE TO RELATED APPLICATIONS

The present application is a continuation-in-part of U.S. application Ser. No. 13/500,956, filed on Mar. 9, 2011, and entitled "Activated Inorganic Metal Oxides", and published as U.S. Publication No. 2012/0238716, presently pending. U.S. application Ser. No. 13/500,956 claims priority from Provisional Application No. 61/312,869, filed on Mar. 11, 2010, and entitled "Activated Inorganic Metal Oxides". The present application also claims priority from U.S. Provisional Patent Application Ser. No. 61/661,071, filed on Jun. 18, 2012, and entitled "Low Molecular Weight Polyisobutylene Composition and Process for Producing Such Composition".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the production of polyisobutylene. The present invention also relates to catalysts used in organic compound conversion reactions. More particularly, the present invention the relates to plasticizer compositions having internal vinylidene molecules.

2. Description of Related Art Including Information Disclosed Under 37 CFR 1.97 and 37 CFR 1.98

Polyisobutylene is a commercially important polymer that finds a great number of applications exploiting its thermal, stability, good flexibility at ambient temperatures, and impermeability to gases. Polyisobutylene has many properties that differentiate it from most other polymers. First, polyisobutylene has a first markedly low permeability to small molecule penetrants. Secondly, polyisobutylene has one of the weakest temperature dependencies of structural relaxation and viscosity (i.e., low fragility) and, correspondingly, strong inelastic scattering (boson peak) even at temperatures much above the glass transition. Polyisobutylene also has a very small difference between the temperature dependencies of segmental and chain relaxations, which can lead to an apparent conformance to time-temperature superpositioning, unlike the obvious breakdown seen in other polymers such as polystyrene, polyvinyl acetate, and polypropylene. Polyisobutylene also has a mechanical segmental dispersion much broader than expected for such a low fragility material. Polyisobutylene also has a very unusual spectrum of fast dynamics, that is, a "constant loss" regime where the susceptibility changes negligibly with frequency. Polyisobutylene can be viewed as a very unusual polymer with properties deviating from behavior common for many other polymers.

Polyisobutylene is an isobutylene polymer containing one double bond per polymer molecule. In high-reactive polyisobutylene, the double bond is at or near the end of the polymer chain making the product more reactive. When the double bond is located at internal positions, polyisobutylene is less reactive, creating low-reactive polyisobutylene.

The polymerization of isobutylene using a Friedel-Craft type catalyst, including boron trifluoride, is a generally known procedure. The degree of polymerization of the products obtained varies according to which a number of known polymerization techniques is used. In this latter connection, it is understood that the molecular weight of the polymer product is directly related to the degree of polymerization. It is also known that polyisobutylene can be manufactured in at least two different major grades, i.e. regular and high vinylidene. Conventionally, these two product grades have been made for different processes, but both often and commonly use a diluted isobutylene feedstock in which the isobutylene concentration can range from 40 to 60% by weight. More recently, it has been noted that at least high vinylidene polyisobutylene may be produced using concentrated feedstock having an isobutylene content of 90% by weight or more. Non-reactive hydrocarbons, such as isobutane, n-butane and/or other lower alkanes, commonly present in petroleum fractions, may also be included in the feedstock as diluents. The feedstock may also contain small qualities of other unsaturated hydrocarbons, such as 1-butene and 2-butene.

Regular grade polyisobutylene may range in molecular weight from 500 to 1,000,000 or higher, and is generally prepared in a batch process at low temperature, sometimes as low as $-50°$ C. to $-70°$ C. $RAlCl_2$ or $R_2AlCl$ are often used as catalysts. The catalyst is generally not totally removed from the final polyisobutylene product due to the processing peculiarities. Molecular weight may be controlled by temperature since the molecular weight of the product varies inversely with temperature. That is to say, higher temperatures produce lower molecular weights. Reaction times are often in the order of hours. Regular polyisobutylene may be used as a viscosity modifier, particularly in lube oils, as a thickener, and as a tackifier for plastic films and adhesives. Polyisobutylene can also be functionalized to produce intermediates for the manufacture of detergents and dispersants for fuel and lube oils.

Traditional processes to make high-reactive polyisobutylene use a liquid polymerization catalyst. The catalyst is continually fed to the reactor and mixed with isobutylene monomer. The liquid catalyst is toxic, hazardous, and requires special handling systems and procedures to avoid exposure and vapor release. As the reaction mixture leaves the reactor, the catalyst must be completely neutralized and separated. The separation process involves washing the neutralized catalyst complex from the reaction mixture with copious amounts of water to remove all catalyst residues. Trace amounts are corrosive to subsequent processing steps and detrimental to product quality and stability. The neutralized catalyst cannot be recycled. This process substantially increases plant capital investment, increases operating costs, and generates approximately as much waste water as product.

FIG. 1 is an illustration of the polymerization mechanism for isobutylene. Isobutylene is made by the cationic polymerization of isobutylene, generally by using a Lewis acid catalyst. These catalysts typically include $AlCl_3$, $BS_3$, and complexes of $BS_3$. The first step is the initiation step (I) and involves association of the catalyst with the isobutylene monomer so as to give the initial carbocations. The propagation step (P) is the second step where additional monomer adds to initial carbocation so as to generate a new carbocation at the end of the growing chain. Chain propagation continues until a desired number of monomer units (molecular weight) is reached. The termination step (T) occurs when carbocation reacts with the catalyst residue instead of another monomer unit, consequently generating a double bond. The termination step (T) and the propagation step (P) are competing reactions. The propagation step (P) is favored at lower reaction temperatures. The termination step (T) is favored at higher reaction temperatures. Therefore, the polymer molecular weight is inversely proportional to reaction temperature. Higher reaction temperatures produce lower molecular weight and lower reaction temperatures produce higher molecular weights.

The termination step (T) can produce two major olefin isomers, namely, alpha vinylidene (Structure 1) and beta trisubstituted olefin (Structure 2). Structure 1 is kinetically preferred since it forms more rapidly. Structure 2, and other substituted olefins, are thermodynamically preferred and more stable. Accordingly, Structure 1 can isomerize to less desirable Structure 2 and higher substituted olefins. To prevent isomerization and "lock in" the preferred Structure 1 isomer, the polymerization catalyst needs to be neutralized or isolated rapidly from the reaction mixture. There are several ways this is accomplished. In particular, one of the steps is neutralization with basic pH media and subsequent removal by conventional means, such as absorption onto active substrates or through the use of conventional separation techniques.

A great number of different types of catalyst systems have been proposed in the past for conducting organic compound conversion reactions. These systems include the use of (1) metal oxide $BF_3$ complexes, (2) $BF_3$ and liquid $BF_3$ complexes as catalysts for isobutylene polymerization, (3) liquid $BF_3$ methanol complexes as isobutylene polymerization catalysts, and (4) solid isobutylene polymerization catalysts. Prior art relevant to these prior art systems is discussed below.

Inorganic metal oxides, such as alumina, have been provided with catalytic activity in the past by contacting the same with $BF_3$, usually in gaseous form. The contacting is usually followed by hydrolysis and calcination or some other post-treatment. These catalysts generally have limited activity, are not stable and release free $BF_3$ into the reaction products requiring post reaction removal of these residues.

U.S. Pat. No. 2,804,411, assigned to American Oil Company, discloses treatment of a Si stabilized gelled alumina with gaseous $BF_3$. Free $BF_3$ is required to be added to the reaction mixture.

U.S. Pat. No. 2,976,338, assigned to Esso, describes an olefin polymerization catalyst comprising a $BF_3H_3PO_4$ complex that may be absorbed onto a solid support.

U.S. Pat. No. 3,114,785, assigned to UOP, describes an olefin isomerization catalyst made by contacting anhydrous gamma or theta alumina with gaseous $BF_3$ at temperatures from about 100° C. to 150° C. for 10 hours or until alumina is saturated. The process of olefin isomerization using the $BF_3$-alumina catalyst is claimed; the composition of the catalyst is not claimed.

U.S. Pat. No. 4,407,731, assigned to UOP, claims catalytic compositions of matter prepared by pre-treating a metal oxide, such as alumina, with aqueous acid and base followed by calcination. The treated gamma alumina is then treated with $BF_3$ gas at temperatures of 308-348° C. at elevated pressure to obtain the final catalyst useful for oligomerization and alleviation reactions.

U.S. Pat. No. 4,427,791, assigned to Mobil Oil Co., discloses a method for enhancing the activity of metal oxides, such as alumina, by treating the alumina with $NH_4F$ or $BF_3$, contacting this fluoride-containing product with an ammonium exchange solution and then calcinating the final product.

U.S. Pat. No. 4,918,255, assigned to Mobil Oil Co., describes an isoparaffin alkylation catalyst based on metal oxides and aluminosilicate zeolites treated with a Lewis acid, including $BF_3$, in the presence of a controlled amount of water or water-producing material. Excess $BF_3$, to that needed to saturate the metal oxide is used requiring post reaction $BF_3$ removal.

U.S. Pat. No. 4,935,577, assigned to Mobil Oil Co., describes a catalytic distillation process using a non-zeolite metal oxide activated with $BF_3$ gas. Excess $BF_3$, above that needed to saturate the metal oxide, is used requiring post reaction $BF_3$ removal $BF_3$ and liquid $BF_3$ complexes as catalysts for isobutylene polymerization.

The homogenous catalytic polymerization of olefins using gaseous $BF_3$ and liquid $BF_3$ complexes is well known. The polymers generally so produced are of the highly reactive type wherein a large percentage of the polymer contains terminal double bonds or has a high vinylidene content. All of these processes require post-reaction removal of the $BF_3$ catalyst.

U.S. Pat. No. 4,152,499, issued to Boerzel et al., describes the synthesis of polyisobutylene having a degree of polymerization of 10-100 units using a blanket of $BF_3$ gas as the catalyst. The polyisobutylene product was then reacted with maleic anhydride in yields of 60-90% indicating a large portion of vinylidene end groups.

U.S. Pat. No. 4,605,808, issued to Samson, describes production of a polyisobutylene having at least 70% unsaturation in the terminal position. An alcohol complex of $BF_3$ was used as the catalyst. The complexing of the $BF_3$ seems to give better control of the reaction and higher vinylidene content.

U.S. Pat. No. 7,411,104, assigned to Daelim Industrial Co., describes a method for producing highly reactive polyisobutylene from a raffinate-1 stream using a liquid $BF_3$ secondary alkyl ether-tertiary alcohol complex. The process requires low reaction temperatures and the catalyst complex is not stable and must be made in situ. The catalyst must be removed from the reactor effluent by a post-reaction treatment process.

U.S. Pat. No. 5,191,044, issued to Rath et al., discloses a process for preparing polyisobutylene in which the $BF_3$ catalyst is completely complexed with an alcohol such that there is no free $BF_3$ in the reactor or in the reaction zones. An excess of alcohol complexing agent is required to assure that no free $BF_3$ is present. The reaction times are on the order of 10 minutes with reaction temperatures of below 0° C.

Rath, in U.S. Pat. No. 5,408,018, describes a multistage process for preparing highly reactive polyisobutene with a content of terminal vinylidene groups of more than 80 mol % and an average molecular weight of 500-5000 Daltons by the cationic polymerization of isobutene or isobutene-containing hydrocarbon feeds in liquid phase with the aid of boron trifluoride as catalyst and at from 0° C. to −60° C. The polymerizing is in the presence of secondary alcohols with 3-20 carbon atoms and/or ethers with 2-20 carbon atoms.

Olefin polymerization, especially isobutylene polymerization, is an exothermic process. Control of reaction temperature is critical to product quality, catalyst life, degree of polymerization and obtaining the desired pre-selected properties. In the patents cited above, the reaction temperature was controlled by dilute olefin monomer concentration, complexed catalyst, multi-stage reactions and/or long reaction times and low reaction temperatures. Low reaction temperatures increase energy requirements; long-reaction times or dilute feed streams increase equipment size and equipment cost (capital expenditures).

U.S. Pat. Nos. 6,525,149, 6,562,913, 6,683,138, 6,884,858 and 6,992,152, to Baxter, et al. describe olefin polymerization processes in which the polymerization is carried out in the tube side of a heat exchanger under turbulent flow conditions. The reactor design allows for very effective and efficient removal of the heat of reaction such that relatively high feed rates and concentrated feed streams may be used. A $BF_3$-methanol complex is used as the catalyst and because this complex is particularly stable, higher reaction temperatures may be used. The $BF_3$-methanol catalyst complex may be preformed, formed in-situ by separate injection of the methanol completing agent, or a combination of both.

The $BF_3$ methanol complexes are very stable allowing for higher isobutylene polymerization temperatures not possible with other $BF_3$ oxygenate complexes, particularly higher alcohols, secondary alcohols, ethers and the like. Also, because higher reaction temperatures may be used, reaction rates are increased.

However, in all of the patents cited above, the $BF_3$, or at least portions of the $BF_3$, catalysts are soluble in the polymer products. Residual $BF_3$ is detrimental to product quality and must be removed as quickly as possible. Hence, these processes must employ some kind of catalyst quench and catalyst removal steps subsequent to the reaction. The quenched $BF_3$ streams cannot be recycled and the $BF_3$ is lost.

Isobutylene and butylene polymerizations have also been conducted using solid catalysts, particularly Friedel-Crafts type catalysts, such as $AlCl_3$. The advantage to these processes is that the catalyst is a solid and is not soluble in the product. Catalyst removal and product purification is much easier than in the $BF_3$ catalyzed reactions.

U.S. Pat. No. 2,484,384, assigned, to California Research Corporation, U.S. Pat. No. 2,677,002, assigned to Standard Oil Co., U.S. Pat. No. 2,957,930, assigned to Cosden Petroleum Corporation and U.S. Pat. No. 3,119,884, assigned to Cosden Petroleum Corporation, all describe $AlCl_3$ catalyzed butylene polymerization processes using a fluidized bed reactor system.

U.S. Pat. No. 4,306,105, assigned to Cosden Petroleum Corporation, describes a chlorinated alumina catalyst prepared by reacting pure alumina with pore chlorine. A fluidized bed reactor is utilized for butene polymerization.

Solid catalysts have also been used to produce olefin polymers with a high proportion of terminal vinylidene groups.

U.S. Pat. No. 5,710,225, assigned to Lubrizol, claims the use of phosphotungstic acid salt to polymerize $C_2$-$C_3$ olefins to produce polymers with molecular weights in the range of 300-20,000. The use of phosphotungstic catalyst, in a fixed bed reactor, is also described, but the flow rate is low and is generally operated as a plug flow reactor. The resulting polymer has an undesirable very high polydispersity. The fixed bed reactor as described in the example would not be economically feasible.

U.S. Pat. No. 5,770,539, assigned to Exxon Chemical Patents, Inc., discloses heterogeneous Lewis acids polymerization catalysts, such as $BF_3$, immobilized in porous polymer substrates. The $BF_3$ is complexed with the aromatic rings of cross-linked polystyrene copolymers.

U.S. Pat. No. 5,874,380, assigned to Exxon Chemical Patents, Inc., claims a solid state insoluble salt catalyst system for the carbocationic polymerization of olefin monomer in the presence of polar or non-polar reaction medium which comprises at least one salt of a strong acid and a carbocationically active transition metal catalyst selected from Groups IIIA, IVA, VA, and VIA of the Periodic Table of the Elements.

U.S. Pat. No. 6,384,154, assigned to BASF Aktiengesellshaft, discloses a process for preparing halogen-free, reactive polyisobutylene by cationic polymerization over an acidic, halogen-free heterogeneous catalyst comprising oxides and elements from transition or main group I, II, III, IV, V, VI, VII or VIII of the Periodic Table of the Elements. The polymerization is carried out in a fixed bed reactor.

The solid, heterogeneous butylene polymerization catalysis cited above do solve the problem of catalyst residues in the reactor effluent, thereby eliminating the need for post reaction treatment. However, conversions are low, space velocities are low and reaction temperatures are low.

$BF_3$ activated metal oxides are not described in the prior art as polymerization catalysts for the manufacture of polybutene or polyisobutylene. In fact, U.S. Pat. No. 6,710,140 assigned to BASF Aktiengesellshaft claims the use of alumina as a solid deactivator to absorb $BF_3$ catalyst residues from polyisobutylene reactor effluents. The resulting $BF_3$-alumina complex is described as not catalytic.

It is an object of the present intention to provide a polyisobutylene composition and process for forming the polyisobutylene composition which avoids the use of washing water and produces no wastes.

It is another object of the present invention to provide a polyisobutylene composition and process for forming the polyisobutylene composition which is a green process.

It is still another object of the present invention to provide a polyisobutylene composition and process for forming polyisobutylene composition which avoids the need for recycling.

It is still another object of the present invention to provide a polyisobutylene composition and process for forming the polyisobutylene composition which produces high yields of high purity product.

It is a further object of the present invention to provide a polyisobutylene composition and process for forming the polyisobutylene composition which is simple and highly effective.

It is still a further object of the present invention to provide a polyisobutylene composition and process for forming the polyisobutylene composition which involves a significantly reduced capital investment, low operating costs and low catalyst costs.

If is still a further object of the present invention to provide a polyisobutylene composition and process for forming the polyisobutylene composition that provides the ability to make anhydride succinics, succinimide, mannich, and split-tail surfactants.

These and other objects and advantages of the present invention will become apparent from a reading of the attached specification and appended claims.

BRIEF SUMMARY OF THE INVENTION

The present invention is a polyisobutylene composition that comprises polyisobutylene molecules wherein a first portion of the polyisobutylene molecules has alpha vinylidene molecules, a second portion of the polyisobutylene molecules has beta vinylidene molecules, and a third portion of the polyisobutylene molecules has internal vinylidene molecules. The first portion is less than 75% of the polyisobutylene molecules of the composition. A total of the first portion and the second portion is less than 90% of the polyisobutylene molecules of the composition. The third portion is more than 3% of the polyisobutylene molecules of the composition.

More specifically, with the polyisobutylene composition of the present invention, a sum of the first portion and the second portion and the third portion is less than 90% of the polyisobutylene molecules of the composition. The second portion is, preferably, less than 10% of the polyisobutylene molecules of the composition. The first portion is preferably between 20% and 75% of the polyisobutylene molecules of the composition. The polyisobutylene composition can have a fourth portion that has tetra-substituted isomers. This fourth portion is less than 5% of the total composition. The polyisobutylene composition will have a molecular weight of between 250 and 5,000 Daltons.

The present invention is also a polymerization process for preparing a polyisobutylene polymer composition. This polymerization process comprises the steps of (1) providing a liquid feedstock containing isobutylene; (2) forming a solid catalyst that is a reaction product of a boron trifluoride/alcohol catalyst complex that is supported on an alumina substrate; (3) positioning the solid catalyst complex in a reactor; (4) flowing the liquid feedstock through the solid catalyst in the reactor such that the isobutylene is catalyzed by the solid catalyst; and (5) discharging the polyisobutylene polymer composition from the reactor. The discharged polyisobutylene polymer composition will have polyisobutylene molecules in which a first portion of the polyisobutylene molecules has alpha vinylidene molecules and a second portion of the polyisobutylene molecules has beta vinylidene molecules and the third portion of the polyisobutylene molecules has internal vinylidene molecules. The first portion is less than 75% of the polyisobutylene molecules of the composition.

In the process of the present invention, the polyisobutylene polymer composition can be distilled after the step of discharging. The step of distilling serves to separate oligomers from the polyisobutylene polymer composition. In particular, the step of distilling includes passing the polyisobutylene polymer composition to a first distillation column, feeding the polyisobutylene polymer composition under pressure in the first distillation column so as to separate isobutane and isobutylene from the polyisobutylene polymer composition, and discharging the polyisobutylene polymer composition from the first distillation column. The step of distilling further includes passing the discharged polyisobutylene polymer composition from the first distillation column to a second distillation column, feeding the polyisobutylene polymer in the second distillation column at atmospheric pressure so as to separate C8 oligomers from the polyisobutylene polymer composition, and discharging the polyisobutylene polymer composition from the second distillation column. The step of distilling further includes passing the discharged polyisobutylene composition from the second distillation column to a third distillation column, feeding the polyisobutylene polymer composition in the third distillation column under vacuum conditions so as to separate C12 and higher oligomers from the polyisobutylene polymer composition, and discharging the polyisobutylene polymer composition from the third distillation column.

The boron trifluoride/alcohol catalyst complex has between 10 to 30% by weight of the solid catalyst. A ratio of the alcohol to the boron trifluoride in the catalyst complex ranges from 0.5 mole of alcohol per mole of boron trifluoride to about two moles of alcohol per mole of boron trifluoride.

In the present invention, the reactor is a fixed bed reactor. The fixed bed reactor has a plurality of tubes extending therethrough. The solid catalyst is received in the plurality of tubes. The process of the present invention includes flowing a heat exchange fluid around an exterior of the plurality of tubes so as to control a temperature of the reaction between the liquid feedstock and the isobutylene in an interior of the plurality of tubes.

The discharged polyisobutylene polymer complex can be passed through a filter in which the filter has alumina therein. As such, any residual boron can be removed from the polyisobutylene. The discharged polyisobutylene polymer composition has the third portion of greater than 3% of polyisobutylene molecules of the composition. A total of the first portion and the second portion being less than 90% of the polyisobutylene molecules of the composition. The discharged polyisobutylene polymer composition has a molecular weight of between 250 and 5,000 Daltons.

The process of the present invention is based on a novel solid catalyst as used as a fixed bed reactor system. The solid catalyst is in the form of beads or other convenient geometric shapes and sizes. The solid catalyst is packed into a tubular reactor forming a stationary, completely-contained bed. The isobutylene monomer is fed to the reactor at a controlled rate and passes over the solid catalyst allowing the polymerization reaction to occur. A separate circulation loop is employed to provide heat transfer. Isobutylene polymerization is highly exothermic so as to generate between 350 BTU/lb. of isobutylene. The circulation loop provides sufficient reaction temperature control ensuring that isothermal conditions are maintained over the reaction bed. This is critical to controlling molecular weight distribution. The residence time over the catalyst is regulated to provide the desired isobutylene conversion.

When the polymer reaction mixture exits the reactor, the polymerization and isomerization reaction has stopped and the crude reaction mixture contains no catalyst residues. As such, no subsequent washing steps are necessary. The reaction mixture is fed directly from the final distillation steps. Since the catalyst is contained solely within the reactor, catalyst injection and handling systems are not required.

Current technology used to produce polyisobutylene has both human and environmental risks. The present invention eliminates waste. The present invention recycles the material so as to minimize human exposure to hazardous materials, reduce catalyst use, and decrease plant capital, energy, and operation cost. The present invention produces no wash water or other waste. There is no human exposure to boron trifluoride gas or boron trifluoride complexes. The very high feed-to-catalyst ratio requires only one to two percent of the catalyst currently used. The cost for building a facility is greatly decreased. Additionally, the energy and operation cost associated with the production of the polyisobutylene in the process of the present invention produces significant annual savings.

This foregoing Section is intended to describe, with particularity, the preferred embodiment of the present invention. It is understood that modifications to this preferred embodiment can be made within the scope of the present invention without departing from the true spirit of the invention. As such, this Section should not be construed as limiting of the scope of the present invention. The present invention should only be limited by the following claims and their legal equivalents.

DETAILED DESCRIPTION OF THE INVENTION

Figure 1:
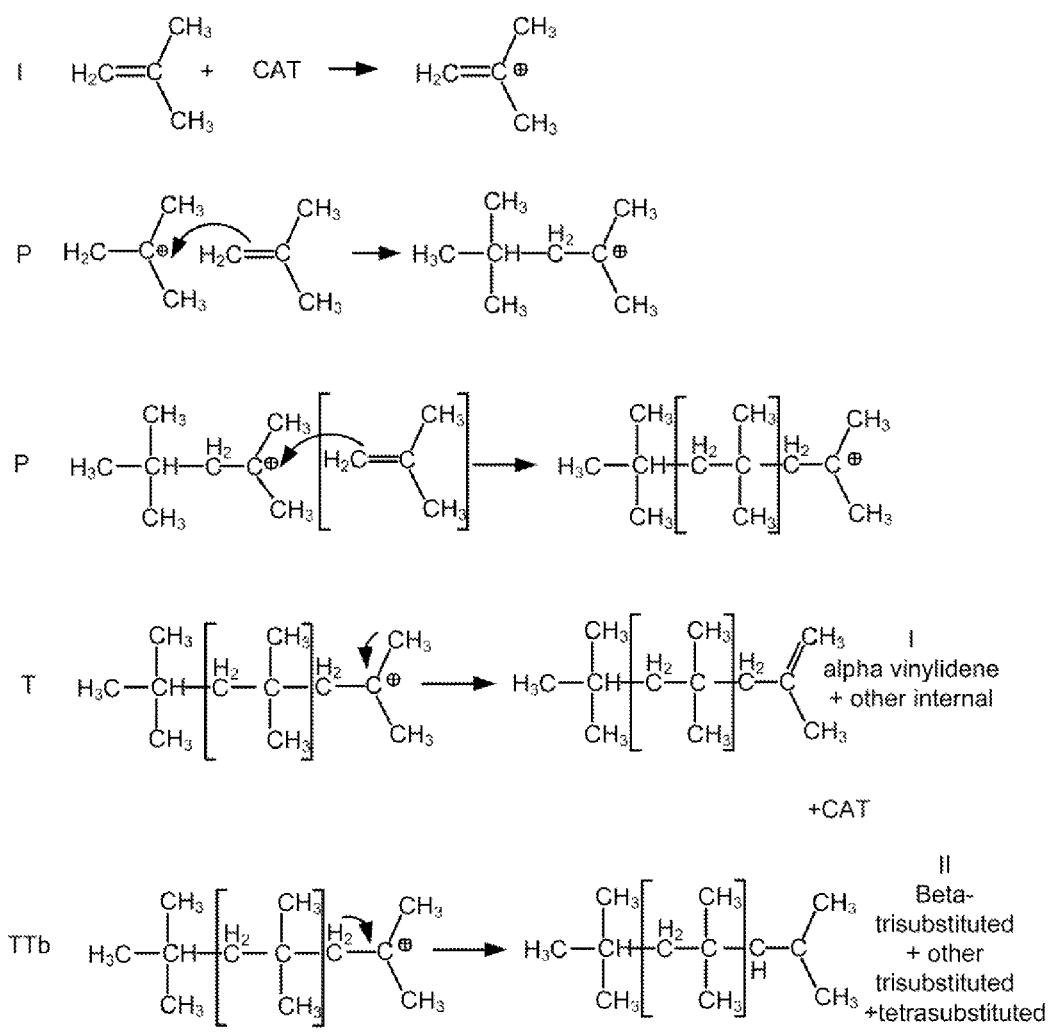
FIG. 1 is an illustration of the typically polymerization mechanism associated with the formation of polyisobutylene from isobutylene.
Figure 2:
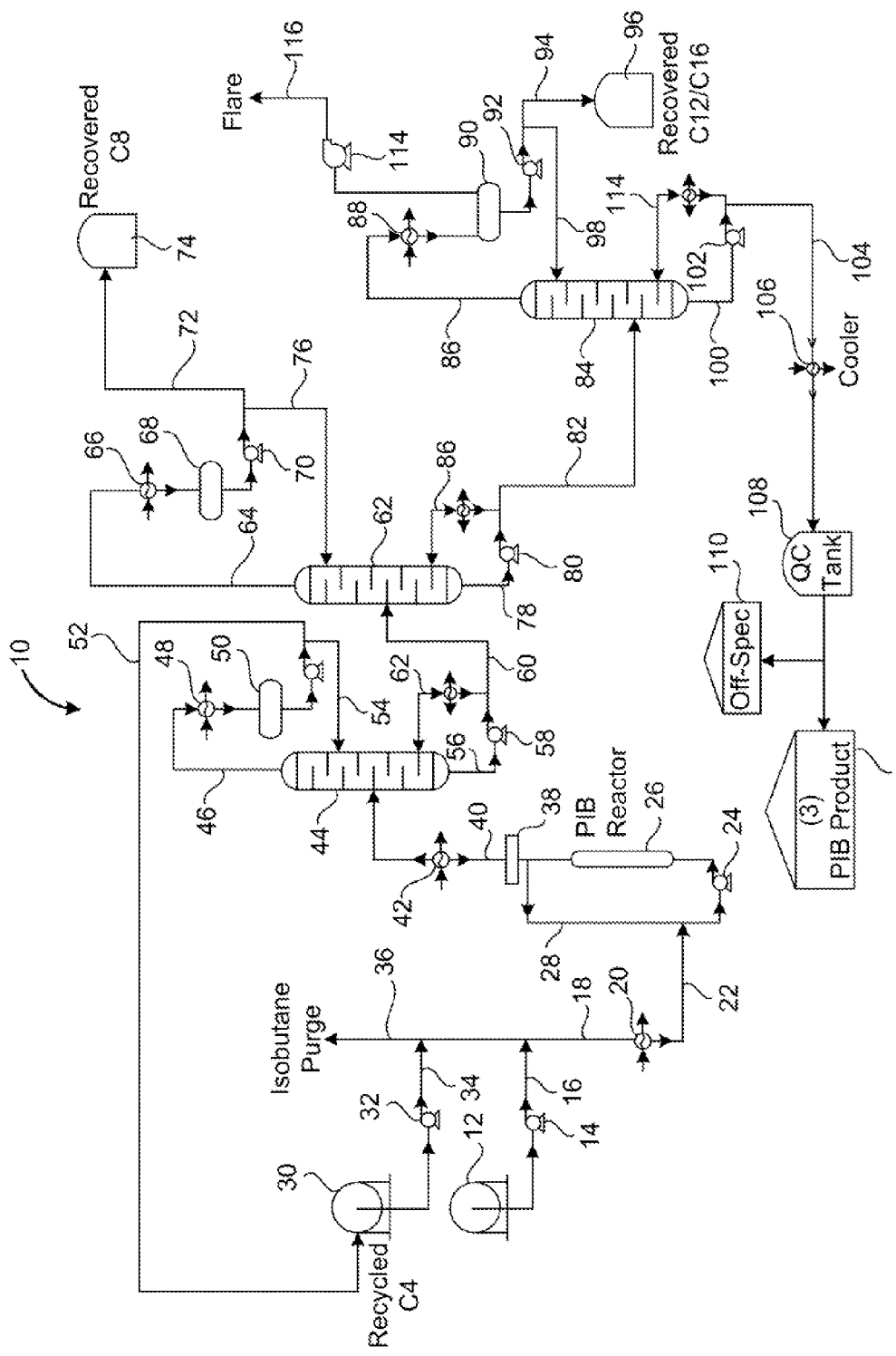
FIG. 2 is a flow diagram showing the process of the polymerization process of the present invention.

Referring to FIG. 2, there is shown the process 10 of the present invention for the polymerization of polyisobutylene. In the process 10 of the present invention, a liquid feed stock containing isobutylene is provided in tank 12. A preferred feedstock is high purity isobutylene which contains greater than 99 weight percent of isobutylene. This feedstock is highly suitable for the production of highly reactive polyisobutylene. Another olefin feedstock can be C4 raffinate. The actual composition of such a stream is variable depending on the source, but a typical C4 raffinate feedstream might contain about 0.5 weight percent of C3, about 4.5 weight percent of isobutane, about 16.5 weight percent of n-butane, about 38.5 weight percent of 1-butene, about 28.3 weight percent of isobutylene, about 10.2 weight percent of cis- and trans-20-butene, and less than 0.5 weight percent of butadiene and less than 1.0 weight percent of oxygenates. The presence of oxygenates may or may not affect the catalytic reaction. The C3 and the n-butane are inert and pass through the reactor unchanged and are removed from the reaction mixture and the downstreams stripping steps. The isobutylene reacts to a high degree depending on the reaction conditions and the desired final product. The 1- and 2-butenes may react to varying degrees depending on the catalyst type and reactor conditions. The unreacted olefins are removed from the polymer product in the downstream stripping steps. These raffinate feedstocks are particularly preferred for the production of polymers in which high reactivity is not important.

Another type of olefin feedstock provided in tank 10 is the effluent from the dehydrogenation of isobutane to isobutylene, referred to simply as dehydro effluent, or "DHE". DHE typically contains about 42-45 weight percent of isobutene, and about 50 to 52 weight percent of isobutane within the balance being small amounts of C3, normal butanes and butylenes, and butadiene. This feedstock is particular suitable for the production of polyisobutylene in location in which the inert isobutane may be utilized, for example in cooperation with an isobutane dehydrogenation unit.

Another olefin feedstock can be DHE in which most of the inert isobutane has already been removed. This stream is known as isobutylene concentrate and typically contains about 88-90 weight percent of isobutene, and 5-10 weight percent isobutane with the balance being minor amounts of C3 normal butanes and butylenes, and butabiene. This feedstock is suitable for the production of highly reactive polyisobutylene.

As can be seen in FIG. 2, the liquid feedstock in tank 12 is fed by pump 14 along lines 16 into a line 18. Line 18 cam include a isobutane purge so that the gaseous isobutane can be removed from the feedstream. A cooler 20 is provided along line 18 so as to reduce the temperature of the feedstream to a range of between 50° F. to 80° F. After the feedstream passes through the cooler 20, the feedstream will flow along line 22 so as to be pumped by pump 24 into the reactor 26. The reactor 26 contains the solid catalyst that will be described hereinafter. A circulation loop 28 is provided in association with the reactor 26 so as to circulate the products of the reaction.

As can be seen in FIG. 2, recycled $C_4$ from the process 10 can flow to a vessel 30. This recycled C4 will include isobutylene and isobutane. Pump 32 will pass this mixture along line 34 to line 18. The isobutane purge allows the gaseous isobutane to flow along line 36 and outwardly of the process 10. The isobutane purge can be recovered for use elsewhere. In this process, the recycled isobutylene can then flow, along with the isobutylene from the feedstock in tank 12 can flow to the reactor 26 in the manner described hereinabove.

A filter 38 is connected to the output from the reactor 26. Under rare circumstances, trace amounts of boron may be part of the output of the reactor 26. The filter 38 can contain alumina therein so as to react with these trace amounts of boron so as to remove the boron from the polyisobutylene of the reactor 26. The output of the reactor 26 flows along line 40 to a heater 42. Heater 32 can elevate the temperature of the polyisobutylene product of the reactor 26 to a temperature of approximately 300° F. As such, this polyisobutylene product will flow to a first distillation column 44. The first distillation column 44 will heat the polyisobutylene product under pressure so as to separate the lights from the polyisobutylene product. The lights, such as C4, will flow outwardly along line 46 from the first distillation column 44. The relatively hot lights flowing along line 46 will pass through cooler 48 so as to be cooled to a desired temperature such that the vapor will condense into a liquid and flow into a collector 50. The vapor flowing through line 46 can include isobutylene and isobutane, along with other oligomers of the polyisobutylene product. The C4 can then flow along line 52 back to the vessel 30 for use in the process. A portion of the condensed lights can flow along line 54 back for use within the first distillation column 44.

The polyisobutylene product, as passed from the first distillation column 44, will flow along line 56 by action of pump 58 so as to flow outwardly therefrom. The pump 58 will pump the polyisobutylene product from the distillation column 44 along line 60 to a second distillation column 62. Additionally, a portion of the polyisobutylene product produced by the distillation column 44 will flow back along line 62 for use within the distillation column 44. Fundamentally, in the first distillation column 44, the low temperature boiling point products will flow upwardly in the first distillation column 44 and the higher boiling temperature products will flow outwardly along line 14. As such, the lights are effectively separated by the first distillation column 44.

The polyisobutylene product from the first distillation column 44 will flow into the second distillation column 62. The second distillation column 62 is heated, and maintained at atmospheric pressure. The heavier C8 oligomer flows from the second distillation column 62 outwardly along line 64 so as to be cooled by cooler 66 for delivery into condenser 68. The condensed liquid can then pass by pump 70 along line 72 to a recovered C8 tank 74. Another portion of the C8 product will flow along line 76 back for use in the second distillation column 62. The polyisobutylene product from the second distillation column 62 flows outwardly along line 78 by action of the pump 80 through line 85 and to a third distillation column 84. A portion of the polyisobutylene product flowing from the second distillation column 62 will pass back to the distillation column 62 along line 86.

The third distillation column 84 is maintained in a vacuum condition so as to separate out the further oligomers, such as C12, C16, C20, C24, etc. As such, these oligomers will flow outwardly of the third distillation column 84 along line 86 to a cooler 88 and eventually to the condenser 90. The condensed liquid is then passed by pump 92 along line 94 to a tank 96 whereby the C12 and C16 can be recovered. A portion of the C12 and the C16 can flow back to the third distillation column 84 along 98. The highly pure polyisobutylene product flows outwardly from the third distillation column 84 along line 100. Pump 102 serves to deliver the high purity polyisobutylene product along line 104 to a cooler 106 and onward to a quality control tank 108, an off-spec tank 110 and a polyisobutylene product tank 112. A portion of the high purity polyisobutylene product can be recycled back to the third distillation column 84 along line 114. The quality control tank 108 allows for a small sample of the high parity of the polyisobutylene product to be collected therein. As such, the high purity polyisobutylene product can be effectively tested for purity. If the polyisobutylene product meets the specifications, it can flow onwardly to the polyisobutylene product tank 112. If the polyisobutylene product in the quality control tank 108 is off-spec, then it will flow to the off-spec tank 110.

Any gases collected from the condenser 90 associated with the third distillation column 84 can be removed therefrom by action of the pomp 114 and ultimately transmitted out of the process 10 along line 116 so as to be flared.

The reactor 26 in the process 10 of the present invention contains a unique activated metal oxide catalyst. Activated metal oxide catalysts of the invention of the present application are prepared by reacting normally liquid $BF_3$/alcohol complexes with anhydrous crystalline aluminum oxide (alumina). Gamma and theta alumina are the preferred crystalline structures.

$BF_3$-alumina compositions of the prior art are not catalytic for some organic conversion reactions, as reported in U.S. Pat. No. 6,710,140. Moreover, in some cases in which the $BF_3$ levels might be catalytic, the $BF_3$ leaches off and requires additional $BF_3$ to be added along with the reactant feed. This, of course, defeats the purpose of a solid heterogeneous catalyst since post treatment of the reactor effluent is required to remove the $BF_3$ residues.

In accordance with the invention of the present application, it has been unexpectedly found that if normally liquid $BF_3$/alcohol complexes are used instead of $BF_3$ gas, the resulting reaction products with crystalline alumina are highly catalytic, stable, have a long life, and are not deactivated or consumed during the catalytic process. Moreover, high loadings of $BF_3$ may be achieved without the problem of $BF_3$ leaching into the reaction mixture.

Suitable crystalline alumina types include theta alumina and gamma alumina. The more preferred crystal structure is gamma alumina because it has a higher capacity for $BF_3$/alcohol catalyst complexes than does theta alumina. Alpha alumina is least preferred. The alumina must be essentially dry before reaction with the $BF_3$/alcohol complex. This may be accomplished by heating the same at 200° C. for 10-20 hours.

The $BF_3$/alcohol complex may be formed by passing $BF_3$ gas through a solution of pure anhydrous alcohol at a rate that allows the $BF_3$ to be efficiently absorbed. The ratio of alcohol to $BF_3$ may generally range from about 0.5 moles of alcohol per mole of $BF_3$ to about 2 moles of alcohol per mole of $BF_3$. A more preferred range is from about 1 mole of alcohol per mole of $BF_3$ to about 2 moles of alcohol per mole of $BF_3$. The most preferred range is from about 1 mole of alcohol per mole of $BF_3$ to about 1.3 moles of alcohol per mole of $BF_3$.

Alcohols in the range of $C_1$-$C_{30}$, with no alpha hydrogens, are suitable for complexing with $BF_3$. Alcohols that have alpha hydrogens are easily dehydrated by $BF_3$ to form olefins. Even if $BF_3$/alcohol complexes may be formed at low temperatures, for example, the resulting complexes are not stable at reaction temperatures. The more preferred alcohols are methanol and neo-alcohols, such as neopentyl alcohol. The most preferred alcohol is methanol. Glycols and polyhydric alcohols with no alpha hydrogens may also be used, for example ethylene glycol.

The reaction of the $BF_3$/alcohol complex with alumina is highly exothermic and must be controlled to avoid loss of $BF_3$. The $BF_3$/alcohol complex may be added by any mechanical means that allows good mixing of the complex with the alumina and that also allows for adequate temperature control. A preferred method is to add the alumina to a rotating double cone mixer and meter in the $BF_3$/alcohol complex such that the temperature is controlled within the desired range. The temperature during the mixing should not exceed 50-60° C.

The concentration of $BF_3$/alcohol complex on the alumina may range from about 10% to about 30% by weight. A preferred range is from about 20% to about 30% by weight. The most preferred range is from about 25% to about 30% by weight. The actual concentration of F or B in the $BF_3$/alcohol complex-alumina system depends on the alcohol used.

The final catalyst composition, which is a $BF_3$/alcohol-alumina reaction product, may be used to catalyze organic compound conversion reactions. The catalyst composition may be contacted with the reactants in a batch or a continuous processes.

Figure 3:
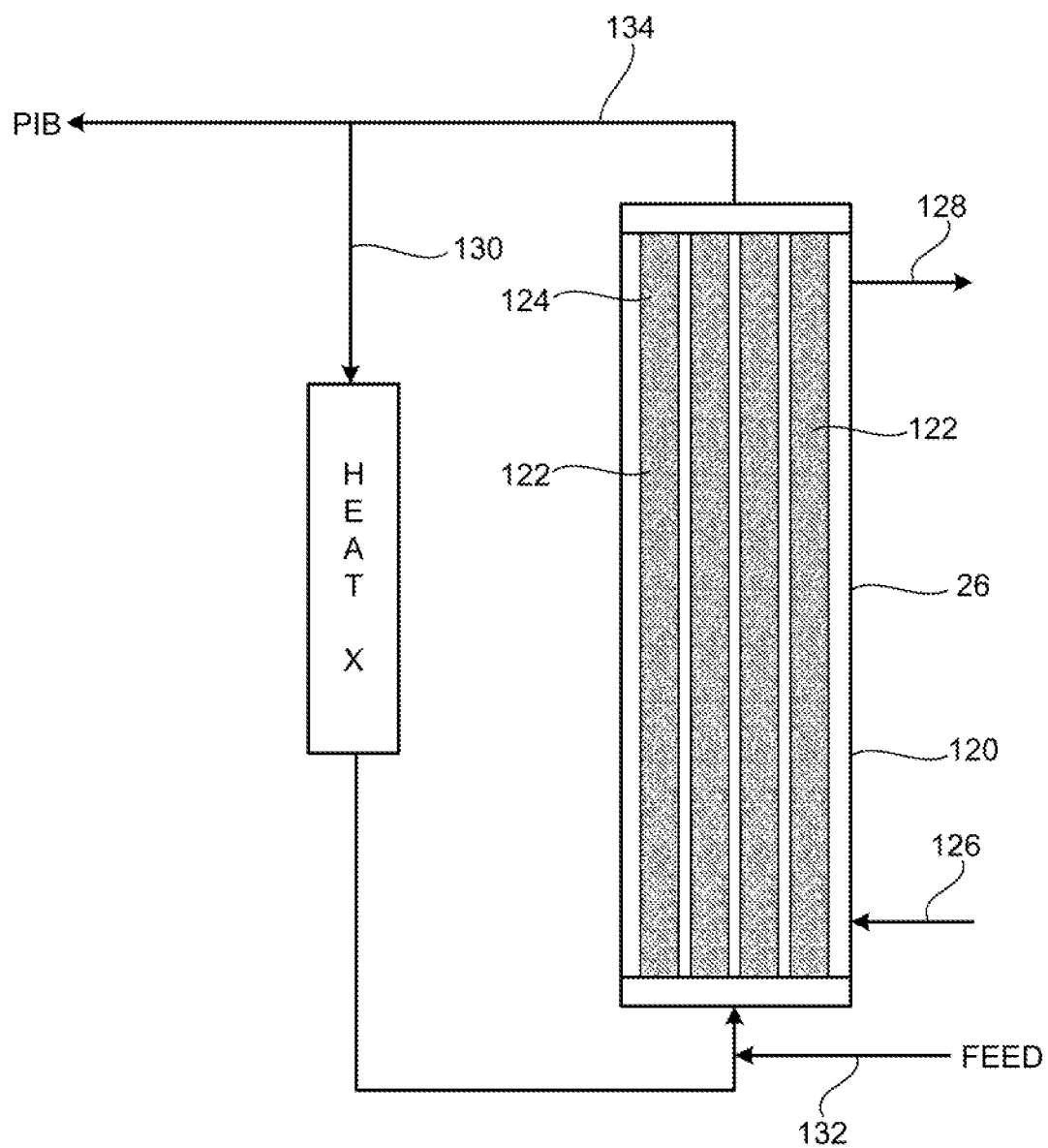
FIG. 3 is a detailed view showing the fixed bed reactor associated with the polymerization process of the present invention.

In the preferred embodiment of the present invention, the reactor 26 can have a shell 120 with a plurality of tubes 122 arranged vertically therein. Each of the tubes 122 has the solid catalyst 124 packed therein. As such, the arrangement shown in FIG. 3 is known as a fixed bed reactor. This especially suitable for highly exothermic reactions, such as olefin polymerization, and, in particular, polyisobutylene polymerization.

As can be seen, the reactor 20 extends vertically, a heat exchange media can pass through an inlet 126 into the interior volume of the shell 120. As such, the heat exchange media can be circulated through the shell 120 and into the interior volume of the reactor 26. The heat exchange media can flow outwardly along outlet line 128 from the shell 120. As such, the heat exchange media can be utilized so as to control the temperature of the reaction.

The reactor 126 can be fitted with a recirculation loop 130 so as to accommodate a volumetric recirculation flow. The isobutylene-containing feedstock the reactor along line 132 by way of a recirculation pump located in a position downstream. The recirculation pump, will push the isobutylene stream through the reactor tubes 122 and returns the stream to the suction side of the pump, to the case of a two-pass heat exchanger, the recirculation flow may enter through the bottom of the reactor 26, then pass through the tubes, exit the reactor from the bottom and return to the pump. The flow scheme constitutes what is generally considered to be a loop reactor. The pump speed, or an internal recirculation loop on the pump itself is used to control the flow rate. The flow rate preferably may be sufficient to generate a velocity that causes turbulent, or at least non-laminar flow, of the isobutylene feedstream over the fixed bed catalyst composition 24 packed within the tubes 22.

The feedstock flow can enter the recirculation loop via a feed pump at a location between the outlet of the recirculation pump and the bottom of the reactor 26 at the beginning of the first pass. At equilibrium, the concentrations of the olefin monomer and the polymer products is constant throughout the reactor so the point at which the reaction effluent leaves the reactor is a matter of choice. It is convenient for the effluent line to be located at the top of the reactor 26 after the first pass. As such, the polyisobutylene can pass from the reactor 26 along line 134. The effluent flow rate is necessarily equal to the volumetric feedstock flow rate. The volumetric feedstock flow rate is independent of the volumetric recirculation flow rate and desirably may be adjusted so as to achieve a desired residence time and conversion.

The reactor may be fitted with appropriate temperature, pressure and flow indicators, along with the controllers necessary to operate under controlled conditions. The size of the reactor 26 is arbitrary and can be based upon the desired volume of the product. A convenient size is ten to fifteen feet in length and four to six feet in diameter. The number of tubes in the reactor 26 and the diameter of the tubes depend upon the catalyst type, size and shape and on the desired output. A convenient number of tubes, for the above-stated reactor size, is between 150 and 200 tubes per pass, with an internal diameter of one-half to one inch. In a two-pass reactor, the tubes extend the full length of the reactor vertically and are connected by end caps at the bottom and top of the reactor. The isobutylene reaction mixture is directed into one side of the bottom end cap and is returned through the other side of the bottom end cap. The interior of the top end cap is open with an outlet for the reaction effluent.

In the preferred embodiment, the reaction pressure may be at least 150 p.s.i.g. or at least at a sufficient level to ensure that a liquid phase is maintained in the reactor. The pressure may be controlled by means of a back pressure regulator on the reactor effluent line. The reactor may be desirably operated at temperatures and conditions to produce polymer products in the molecular weight range, in the case of polyisobutylene, are between 250 to about 5,000 Daltons. Other temperatures and conditions may be used, as required for specific organic conversion reactions.

An unexpected development with the testing of the present invention is that the unique fixed bed reactor 26, as used in the present invention, along with the boron trifluoride/alcohol complex thereon, produced a significant amount of internal vinylidenes. As described hereinabove, the alpha vinylidene will have the following structure:

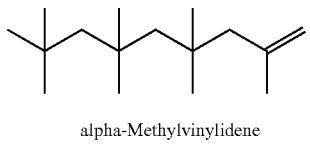 [SMILES: C=C(C)CC(C)(C)CC(C)(C)CC(C)(C)C]

alpha-Methylvinylidene

In contrast, the beta vinylidene will have the following structure:

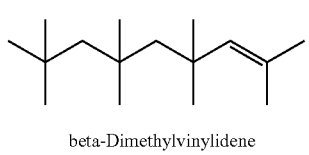 [SMILES: CC(C)=CC(C)(C)CC(C)(C)CC(C)(C)C]

beta-Dimethylvinylidene

The internal vinylidene presents the following structure:

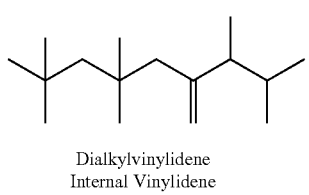 [SMILES: C=C(CC(C)(C)CC(C)(C)C)C(C)C(C)C]

Dialkylvinylidene
Internal Vinylidene

In the testing of the process of the present invention, it was initially believed that the production of internal vinylidenes were detrimental to the finished polyisobutylene product. As in the prior art, it was believed that the best polyisobutylene product would be such a polyisobutylene product having a maximum amount of alpha vinylidenes. As such, one would initially presume that the production of internal vinylidenes would be undesirable. As can be seen, the internal vinylidene is back one carbon on the end of the chain and is disubstitute. Importantly, the internal vinylidene has two carbon atoms similar to that of alpha vinylidene.

Importantly, during testing, it was found that the internal vinylidene process the same quality product and same characteristics as the polyisobutylene having extremely high levels of alpha vinylidene. In particular, the following examples show the various testings and relationship between the alpha vinylidene, the beta vinylidene and the internal vinylidene. Additionally, certain of the other tests showed the tetra-substituted isomers and the disubstituted isomers.

EXAMPLE I

Alpha Vinylidene=50.3% by weight
Beta Vinylidene=12.9 3% by weight
Internal Vinylidene=21.9% by weight
Other=14.9% by weight

EXAMPLE II

Alpha Vinylidene=43.2% by weight
Beta Vinylidene=16.5% by weight
Internal Vinylidene=24.2% by weight
Other=16.1% by weight

EXAMPLE III

Alpha Vinylidene=73.0% by weight
Beta Vinylidene=13.6% by weight
Internal Vinylidene=10.7% by weight
Other=2.7% by weight

EXAMPLE IV

Alpha Vinylidene=71.3% by weight
Beta Vinylidene=12.7% by weight
Internal Vinylidene=9.0% by weight
Disubstituted Isomers=1.8% by weight
Tetra-substituted Isomers=5.1% by weight

EXAMPLE V

Alpha Vinylidene=74.8% by weight
Beta Vinylidene=13.8% by weight
Internal Vinylidene=5.3% by weight
Disubstituted Isomers=1.4% by weight
Tetra-substituted Isomers=5.6% by weight

EXAMPLE VI

Alpha Vinylidene=77.5% by weight
Beta Vinylidene=13.8% by weight
Internal Vinylidene=5.9% by weight
Tetra-substituted Isomers=2.9% by weight

EXAMPLE VII

Alpha Vinylidene=55.8% by weight
Beta Vinylidene=10.9% by weight

Internal Vinylidene=24.4% by weight
Tetra-substituted Isomers=5.7% by weight

EXAMPLE VIII

Alpha Vinylidene=57.7% by weight
Beta Vinylidene=11.7% by weight.
Internal Vinylidene=21.7% by weight
Tetra-substituted Isomers=4.9% by weight From these examples, each of the above-identified compositions produced results similar to that of the high vinylidene polyisobutylene. However, the end polyisobutylene was produced with less cost, fewer environmental issues, and through the use of a fixed bed reactor. Additionally, and importantly, the use of the internal vinylidenes allow the final isobutylene product to be utilized in association with a variety of possible new end products, such as maleic hydride, anhydride succinic, and split-tail surfactants. The internal structure of the internal vinylidene allows for unique products that would not be available if the internal vinylidenes were not present. As such, the present invention, by creating the internal vinylidenes, actually provides a superior isobutylene end product which has the same quality characteristics as the high vinylidene polyisobutylene.

Within the concept of the present invention, as supported by the above examples, the alpha vinylidene should represent less than 75% of the polyisobutylene molecules. The combination of the alpha vinylidene with the beta vinylidene and the internal vinylidene should represent 90% of the polyisobutylene molecules. The internal vinylidene can constitute less than 25% of the polyisobutylene molecules.

The polyisobutylene composition of the present invention is useful for producing compounds used in the manufacture of fuel and lubricant additives. These compounds can include, but are not limited to, polybutenyl succinic and anhydrides, polybutenyl succinimides, polybutenyl amines, polybutenyl phenols, mannich bases derived from the polybutenyl alkyl phenols, and polyalkylene oxides derived from the polybutenyl phenols. The compositions of the present invention can be used to produce any compound made from the reaction with the reactive isomers contained in the compositions therein.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A polyisobutylene composition comprising polyisobutylene molecules, wherein a first portion of the polyisobutylene molecules has alpha vinylidene molecules and a second portion of the polyisobutylene molecules has beta vinylidene molecules and a third portion of the polyisobutylene molecules has internal vinylidene molecules, wherein the first portion has less than 75% of the polyisobutylene molecules of the composition, wherein a total of first portion and the second portion is less than 90% of the polyisobutylene molecules of the composition, and wherein the third portion is more than 3% of the polyisobutylene molecules of the composition, wherein said second portion is less than 10% of the polyisobutylene molecules of the composition.

2. The polyisobutylene composition of claim 1, wherein the first portion is between 20% and 75% of the polyisobutylene molecules of the composition.

3. A polyisobutylene composition comprising polyisobutylene molecules, wherein a first portion of the polyisobutylene molecules has alpha vinylidene molecules and a second portion of the polyisobutylene molecules has beta vinylidene molecules and a third portion of the polyisobutylene molecules has internal vinylidene molecules, wherein the first portion has less than 75% of the polyisobutylene molecules of the composition, wherein a total of first portion and the second portion is less than 90% of the polyisobutylene molecules of the composition, and wherein the third portion is more than 3% of the polyisobutylene molecules of the composition, wherein said polyisobutylene composition has a fourth portion that has tetra-substituted isomers, said fourth portion is less than 5% of the total composition.

4. The polyisobutylene composition of claim 3, wherein said polyisobutylene composition has a molecular weight of between 250 and 5000 Daltons.

5. A polymerization process for preparing a polyisobutylene polymer composition comprising:

providing a liquid feedstock containing isobutylene;

forming a solid catalyst that is a reaction product of a boron trifluoride/alcohol catalyst complex that is supported on an alumina substrate;

positioning said solid catalyst complex in a reactor;

flowing said liquid feedstock through said solid catalyst in said reactor such that said isobutylene is catalyzed by said solid catalyst; and discharging said polyisobutylene polymer composition from said reactor, the discharged polyisobutylene polymer composition having polyisobutylene molecules in which a first portion of the polyisobutylene molecules has alpha vinylidene molecules and a second portion of the polyisobutylene molecules has beta vinylidene molecules and the third portion of the polyisobutylene molecules has internal vinylidene molecules, wherein in the first portion is less than 75% of the polyisobutylene molecules of the composition.

6. The polymerization process of claim 5, further comprising:

distilling the polyisobutylene polymer composition after the step of discharging, the step of distilling or separating oligomers from the polyisobutylene polymer composition.

7. The polymerization process of claim 6, the step of distilling comprising:

passing the polyisobutylene polymer composition to a first distillation column;

feeding the polyisobutylene polymer composition under pressure in said first distillation column so as to separate isobutane and isobutylene from the polyisobutylene polymer composition; and discharging the isobutane- and isobutylene-separated polyisobutylene polymer from the polyisobutylene polymer composition.

8. The polymerization process of claim 7, the step of distilling further comprising:

passing the discharged polyisobutylene polymer composition from said first distillation column to a second distillation column;

feeding the polyisobutylene polymer composition in said second distillation column at atmospheric pressure so as to separate C8 oligomers from the polyisobutylene polymer composition; and discharging the polyisobutylene polymer composition from the second distillation column.

9. The polymerization process of claim 8, the step of distilling further comprising:

passing the discharged polyisobutylene polymer composition from said second distillation column to a third distillation column;

feeding the polyisobutylene polymer composition in said third distillation column under vacuum conditions so as to separate C12 and higher oligomers from the polyisobutylene polymer composition; and discharging the polyisobutylene polymer composition from the third distillation column.

10. The polymerization process of claim 5, said boron trifluoride/alcohol catalyst complex being between 10% to 30% by weight of the solid catalyst.

11. The polymerization process of claim 5, wherein a ratio of the alcohol to the boron trifluoride in the catalyst complex ranges from 0.5 mole of alcohol per mole of boron trifluoride to about two moles of alcohol per mole of boron trifluoride.

12. The polymerization process of claim 5, said reactor being a fixed bed reactor.

13. The polymerization process of claim 12, said fixed bed reactor having a plurality of tubes extending therethrough, said solid catalyst received in said plurality of tubes, the polymerization process further comprising:

flowing a heat exchange fluid around an exterior of said plurality of tubes so as to control a temperature of the reaction between the liquid feedstock and the isobutylene in an interior of said plurality of tubes.

14. The polymerization process of claim 5, further comprising:

passing the discharged polyisobutylene polymer composition through a filter, said filter having alumina therein.

15. The polymerization process of claim 5, the polyisobutylene polymer composition having the third portion of greater than 3% of polyisobutylene molecules of the composition.

16. The polymerization process of claim 5, a total of the first portion and the second portion being less than 90% of the polyisobutylene molecules of the composition.

17. The polymerization process of claim 5, the discharged polyisobutylene polymer composition having a molecular weight of between 250 and 5000 Daltons.

\* \* \* \* \*